(12) United States Patent
Fu et al.

(10) Patent No.: US 8,087,041 B2
(45) Date of Patent: Dec. 27, 2011

(54) ESTIMATING REACH AND FREQUENCY OF ADVERTISEMENTS

(75) Inventors: Qi Fu, Costa Mesa, CA (US); Robert Murray, Irvine, CA (US); Varun Y. Patel, Cypress, CA (US); Pishoy S. Maksy, Newport Beach, CA (US); Ravi K. Desu, Irvine, CA (US); Sean Sullivan, San Clemente, CA (US); Darren Robert Davis, Irvine, CA (US)

(73) Assignee: Google Inc., Mountain View, CA (US)

( * ) Notice: Subject to any disclaimer, the term of this patent is extended or adjusted under 35 U.S.C. 154(b) by 583 days.

(21) Appl. No.: 12/331,938

(22) Filed: Dec. 10, 2008

(65) Prior Publication Data

US 2010/0146531 A1    Jun. 10, 2010

(51) Int. Cl.
  *H04H 60/32*    (2008.01)
(52) U.S. Cl. .......................................... 725/14; 705/7.29
(58) Field of Classification Search .................. None
  See application file for complete search history.

(56) References Cited

U.S. PATENT DOCUMENTS

2007/0219859 A1    9/2007    Huntington
2008/0133342 A1    6/2008    Criou et al.

FOREIGN PATENT DOCUMENTS

JP    2003339040 A    11/2003
KR    2005051125 A    6/2005

OTHER PUBLICATIONS

Notification Concerning Transmittal of International Preliminary Report on Patentability for PCT/US2009/067298 dated Jun. 23, 2011, 6 pages.
Notification of Transmittal of the International Search Report and the Written Opinion of the International Searching Authority, or the Declaration, for PCT/US2009/067298, dated Mar. 18, 2011, 9 pages.
U.S. Appl. No. 12/247,069, filed Oct. 7, 2008, Hawkins et al.
U.S. Appl. No. 12/257,879, filed Oct. 24, 2008, Hawkins et al.

*Primary Examiner* — Andrew Koenig
*Assistant Examiner* — Rong Le
(74) *Attorney, Agent, or Firm* — Fish & Richardson P.C.

(57) ABSTRACT

Estimating the reach and device frequency of a proposed advertising campaign based on the probability that advertising content delivery devices (e.g., a television set top box, radio) were used to deliver advertising content (e.g. television ad, radio ad) during specific time periods on specific delivery device channels.

20 Claims, 4 Drawing Sheets

ESTIMATING REACH AND FREQUENCY OF ADVERTISEMENTS

BACKGROUND

This disclosure relates to advertising.

Advertisers often set exposure goals for advertising campaigns for advertising content, e.g., creatives, television ads, or radio ads, and devise strategies, e.g., when to air the advertising campaign content, to achieve these goals. Often the strategies are based on the exposure of advertising content in previously aired campaigns. The exposure of an advertising campaign can be gauged, for example, by the number of unique devices, e.g., set top boxes, televisions, or radios, used to present the advertising campaign content ("reach") and the number of times a particular device is used to present the advertising campaign content ("device frequency") during a timeframe of interest. The reach and device frequency associated with an advertising campaign can be derived from reporting data received from viewing devices or listening devices, e.g., set top boxes or radios, that automatically collect and transmit such pattern information to a collection entity.

Based on the estimated exposure of advertising content in previously aired campaigns, advertisers can devise or adjust strategies for their proposed, i.e., yet to be aired, advertising campaigns. However, the effectiveness of these strategies devised to achieve an advertiser's exposure goals is limited by the accuracy with which the exposure of the content in previously aired campaigns is estimated. Furthermore, it is difficult to estimate reach and frequency for proposed campaigns, as estimating overlap of viewership in the future can be challenging.

SUMMARY

In general, the subject matter of this specification relates to systems and methods for estimating the reach and device frequency of an advertising campaign.

One aspect of the subject matter described in this specification can be embodied in a method including accessing time block data for a plurality of time blocks. Each time block defines a time period during which programming of a channel is aired. For each time block, devices that were used to present programming of the channel during the time period defined by that time block are identified. First probability data for each identified device are generated. The first probability data include a first probability that the identified device was used to present content on the channel during the time period defined by that time block. For each device, second probability data that include second probabilities that the device was used to present the content in each time block in sets of two or more time blocks are generated. The second probabilities are based on the first probabilities associated with the time blocks in the sets of two or more time blocks. Reach data for a campaign are generated. The reach data are based on the first and second probabilities and are representative of a reach of the campaign to be presented in the time blocks.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Predicting the exposure of advertising content (e.g., creatives, television ads, radio ads) in a proposed advertising campaign is based on probability data describing likelihoods that devices, e.g., set top boxes, televisions, radios, were used to present advertising content in specific time blocks. Each time block defines a specific time period during which programming is aired on a specific channel or network, e.g., a particular channel between 1 PM and 2 PM on Wednesday. The probability data can be derived from viewing information gathered by viewing devices, e.g., set top boxes, computing devices that receive video and/or audio programming, or radios, that automatically report activities such as channel tunes and the times at which the devices were tuned to the channels.

The probability data, which are based on the exposure of advertising content in time blocks from a reference timeframe, e.g., the previous thirty days, include probabilities that a given device was used to present advertising content in a particular time block and probabilities that a given device was used to present advertising content in each time block in a set of two or more time blocks. This latter probability is an overlap likelihood that is determinative of an estimated reach.

Based on the probability data derived from time blocks in the reference timeframe and a projected number of impressions for the proposed advertising campaign (e.g., the number of times the advertising content is to be presented in the time blocks), the reach of the proposed advertising campaign and the device frequency of devices to be used to present the proposed advertising campaign are estimated.

In the context of television viewing devices, such as set top boxes, the reach is the number of unique viewing devices to be used to present the proposed advertising campaign, and the device frequency is the number of times the viewing devices are to be used to present television ads in the proposed advertising campaign.

Figure 1:
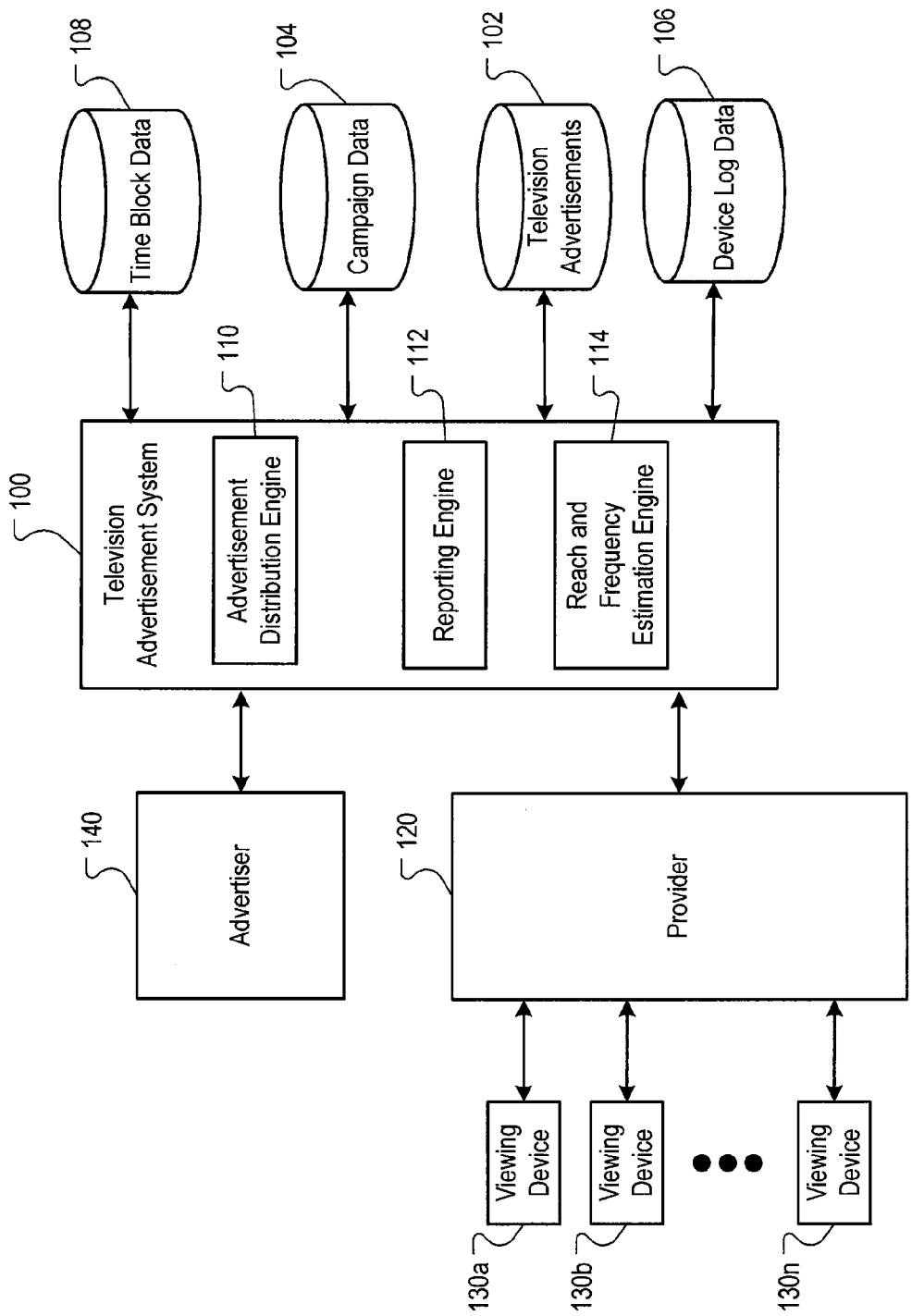
FIG. 1 is a block diagram of an example television advertisement system.

FIG. 1 is a block diagram of an example television advertisement system 100. Television advertisement system 100 delivers advertising campaign content, e.g., television ads/creatives, to an advertising population to facilitate operator monetization of programming and quantification of content delivery to target markets. For example, the content can be a television ad or creative presented on a television. A creative can be, for example, a video portion of a television advertisement. The video portion of the advertisement can include audio and text. The creative can be shown separately from a television program in the form of a television commercial, or can be shown concurrently with a television program in the form of an overlay or text stream on a portion of a television display. For convenience, advertisements and creatives are synonymous as used herein.

The television advertisement system 100 is typically implemented in a plurality of computer servers, and can provide and receive data over a network. Example networks include local area networks (LANs), wide area networks (WANs), telephonic networks, and wireless networks (e.g., 802.11x compliant networks, satellite networks, cellular networks, etc.). Additionally, the television advertisement system 100 can, for example, communicate over several different types of networks, e.g., the Internet, a satellite network, and a telephonic network.

In general, the television advertisement system 100 can receive television advertisements and campaign data from an advertiser 140, e.g., an entity that provides television advertisements, such as a commercial entity that sells products or services, an advertising agency, or a person. The television advertisement system 100 can facilitate the provisioning of television advertisements to a television provider 120, e.g., an entity that facilitates the delivery of a television broadcast (e.g., the programming of a television network) to viewers, such as cable provider, a digital satellite provider, a streaming media provider, or some other media provider.

The television advertisement system 100 can also, for example, obtain viewing information related to viewing devices 130a-130n. Example viewing devices 130 include set top boxes, digital video recorders and tuners, and other television processing devices that facilitate the viewing of the television signal on a television device. In some implementations, logs related to viewing device 130 activity, e.g., set top box logs, can be anonymized to remove personal information related to viewing activities by the television advertising system or prior to being provided to the television advertisement system 100. In other implementations, such information can be provided by the provider 120, or by a third party.

The television advertisement system 100 also includes one or more data stores to store television advertisements and associated data. In one implementation, the television advertisement system 100 includes a television advertisement data store 102, a campaign data store 104, a device log data store 106, and a time block data store 108.

The television advertisement data store 102 can, for example, include advertisements that can be broadcast or aired during an advertisement spot. Example television advertisements include video advertisements, banner advertisements, overlay advertisements, such as logos, URLs, dynamic pricing information for an advertisement, etc., and other advertisements that can be used to convey information visually and/or aurally during a television broadcast.

The campaign data store 104 can include, for example, campaign information for multiple advertisers. An advertising campaign can describe an ad or a group of related ads, and how ads have been or will be aired. Each campaign may be identified by a campaign identifier included in the campaign data store 104. Each campaign identifier can be associated with one or more ads to identify ads related to the campaign. For example, a game system manufacturer may have a holiday season game console campaign with two advertisements, one advertisement for a handheld gaming console and one advertisement for a desktop gaming console.

The device log data store 106 can include, for example, data logs/television reporting data from viewing devices 130, e.g., set top boxes, satellite receivers, etc. The log data store 106 can store reporting data that include channel identifiers, e.g., channel tunes, identifying channels having programming that was presented by use of the viewing devices 130, such as may occur when the viewing device 130 is processing video data to record and/or display. The log data store 106 can also store reporting data that include device time data identifying times and/or durations at which (or with which) a viewing device was used to present the programming of the channels; and device identifiers identifying the viewing devices 130. The log data can be anonymized to protect individual users, through, for example, removal of personally identifying information, demographic aggregation of data, anonymization of user identifiers and/or device identifiers, and the like.

The time block data store 108 can include data defining a plurality of time blocks. A time block defines a particular time period during which programming of a particular network or channel is aired. As such, for some timeframe, e.g., a week, the programming of each channel or corresponding broadcast network providing the programming aired or to be aired on that channel can be divided up into a set of time blocks specific to that channel or network. Time blocks can be of different durations; typically a time block is measured in 30-minute durations. However, time blocks can be of longer or shorter durations.

The television advertisement data store 102, campaign data store 104, viewing device log data store 106, and time block data store 108 can be implemented separately or in combination. For example, in one implementation, the advertisement data store 102, campaign data store 104, log data store 106, and time block data store 108 can be implemented in a single advertisement database. Other combinations and/or subcombinations can also be used.

The television advertisement system 100 can include an advertisement distribution engine 110, a reporting engine 112, and a reach and frequency estimation engine 114. The advertisement distribution engine 110, reporting engine 112, and reach and frequency estimation engine 114 can, for example, be distributed among a plurality of computer devices, e.g., server computers communicating over a network, or can be implemented on a single computer, e.g., as multiple threads on a server computer. Other implementation architectures can also be used. The advertisement distribution engine 110, reporting engine 112, and reach and frequency estimation engine 114 can, for example, be implemented in software, such as executable object code, interpreted script instructions, or in combinations of executable and interpreted instructions.

The advertisement distribution engine 110 can, for example, be configured to provide approved advertisements to the television provider 120. In one implementation, the advertisements are provided to the television provider 120 in advance of airing the advertisements. In some implementations, after receiving a request for any new advertisements to be downloaded for airing by the provider 120, the television advertisement system 100 can, for example, label the download with a particular ID that can be used later to identify the advertisement and the distribution engine 110 can deliver the advertisement to the appropriate provider 120.

The reporting engine 112 can, for example, receive advertisement reporting information from the provider 120 and determine whether the selected television advertisement aired based on the advertisement report information. For example, an advertisement may not air due to a programming irregularity, e.g., a sporting event going beyond a scheduled broadcast, an interruption to scheduled programming due to breaking news, etc.

In some implementations, the reporting engine 112 can access the reporting logs from the device log data store 106, the time blocks from the time block data store 108, and programming information from the providers 120. Based on this information, the reporting engine 112 can create associations between the device identifiers, the channel identifiers and the device time data to identify the time blocks in which each viewing device 130 was used to present programming on the channel corresponding to the time block, and the duration each viewing device was used to present the programming for the channel associated with that time block. For example, if a viewing device 130 was tuned to a particular channel for a 30-minute time block for durations of 4 minutes, 6 minutes, and 11 minutes, then the duration that viewing device was used to present the programming during that time block for that channel is 21 minutes.

In some implementations, the reporting engine 112 can relate television broadcast networks to the channel identifiers from the device reporting logs. Thus, for example, reporting engine 112 can associate viewing device 130a that was tuned to a television network on a channel between 8 AM and 9 AM on Saturday and tuned to another television network on another channel between 8 AM and 9 AM on Tuesday with time blocks defining those time periods, channels and/or networks.

The reporting engine 112 can also be used to determine the number of impressions for each airing of an advertisement. The impressions can, for example, be measured statistically. An impression can be a household impression, e.g., the airing of an advertisement in household and independent of the number of televisions in a household. If the advertisement is aired on a viewing device in the household, one household impression can be recorded. In some implementations, impressions can be measured by an analysis of activity logs of the viewing devices 130. For example, a household may have three viewing devices 130, and at a given time two of the devices may be tuned to a first channel and the third device may be tuned to a second channel. If a first commercial airs on the first channel and a second commercial airs on the second channel during a time that the logs for the viewing devices 130 indicated that the viewing devices are tuned to the channels, impressions can be generated for each viewing device. In some implementations, an impression can be based on a portion of advertisement exposure, e.g., a brief exposure of an advertisement, or a full viewing of the advertisement, or a threshold viewing in between, e.g., five seconds, or five seconds of the first fifteen seconds; or a percentage of the advertisement viewed, etc.

Figure 2:
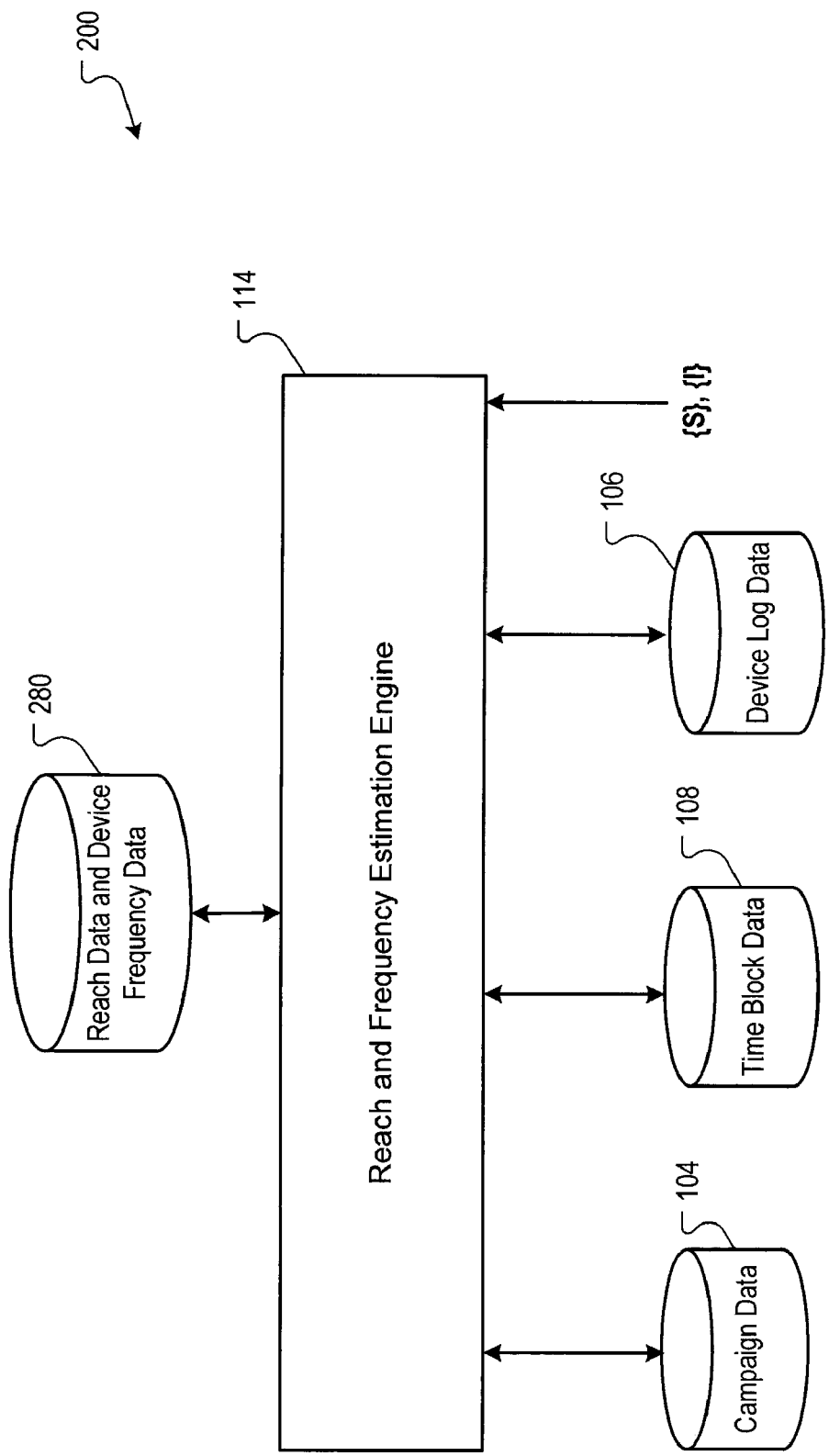
FIG. 2 is a block diagram of an example television advertisement reach and frequency processing system used in the television advertisement system of FIG. 1.

Operation of the reach and frequency engine is described with reference to FIG. 2, which is a block diagram of an example television advertisement reach and frequency processing system 200 used in the television advertisement system of FIG. 1. The system 200 includes the reach and frequency estimation engine 114, which can estimate reach and device frequency for proposed (i.e., future) campaigns based on historical viewing habits. Such historical viewing habits can be derived from, for example, the reporting logs from the viewing devices 130. In general, viewing habits of viewers are repetitive on a periodic basis, e.g., weekly. Accordingly, the likelihood that an ad impression will occur in a future time block can be readily estimated based on the likelihood that an ad impression occurred in a corresponding previous time block.

However, the estimation of reach and device frequency does not readily follow from the number of recorded impressions. As reach is defined as the number of unique viewing devices used to present an ad, the reach value decreases as viewership overlap for the campaign increases. For example, an ad with 10 impressions can have a maximum reach of 10 if 10 unique viewing devices were used to present the ad; alternatively the ad can have a minimum reach of one if the same viewing device was used to present the ad at 10 ad airings (an ad airing is a unique ad time slot for a particular channel in which an ad is aired). Thus when estimating reach and device frequency values for future campaigns, the viewership overlap between various time blocks must be considered.

As long as viewing patterns are substantially stable, the behavior of viewing devices 130 can be modeled as probabilities that can be used in the prediction of future impressions. In other words, if a viewing device 130 is used to present X minutes of a time block in a past week, the ratio of X/(time block duration) can be used as an estimation of a first probability that the viewing device 130 will be used to present a randomly inserted ad during the same time block in the next week. In some implementations, the first probability is considered an expected impression for the viewing device 130. The expected impression can be used to represent a partial impression, as the probability that the viewing device will be used to present a randomly inserted advertisement will frequently be less than 1.0. All of the partial impressions for all viewing devices for a time block are aggregated to determine the total number of partial impressions for a particular time block, as well as the expected viewership overlap among different viewing devices 130.

The reach and frequency estimation engine 114 measures viewership overlap that considers the individual probabilities of each viewing device 130 presenting a randomly inserted ad in the programming of a time block. In some implementations, the first probabilities of the viewing devices 130 for each time block can be considered mutually independent. Accordingly, a second probability—an overlap probability (i.e., a probability of viewership overlap)—of a viewing device 130 being used to present an advertisement in any two or more time blocks is the product of the individual first probabilities of the viewing device 130 for those time blocks. As with the individual probabilities of the viewing devices 130, the overlap probabilities can be counted as overlapping impressions. These probabilities of individual time blocks and overlap between time blocks for the viewing devices are then compared to impression estimates for the time blocks to calculate reach and frequency estimates.

To calculate the partial impressions (first probabilities) for each viewing device and each time block, the reach and frequency estimation engine 114 can perform the following calculation of Equation (1) below:

$$P1 = VD \text{ duration (time block } x\text{)/Time Period(time block } x\text{)} \quad (1)$$

Where:

P1 is a first probability (i.e., the individual probability) that a viewing device VD was used to present an ad in the programming defined by time block x, and is equal to:

VD duration (time block x) is the duration of time for which viewing device VD was used to present the programming of time block x; and Time Period(time block x) is the time period of time block x.

The duration with which a viewing device 130 was to present the programming of a time block (e.g., VD duration (time block x)) can be derived in part from the log data/television reporting data from a viewing device 130. For example, an example set top log record includes the following data:

V_ID00001111:
OperatorID=1243.HeadendID=22.InsertionZone=243.
Channel=123.Start=8:04:00 pm.End=8:06:30 pm where V_ID00001111 is an anonymized device identifier identifying a viewing device 130, OperatorID, HeadendID, and InsertionZone are identifiers related to a particular operator 120 and corresponding geographic location, Channel is a channel identifier identifying the channel which the viewing device was used to present, Start is a first tune time indicating when the viewing device 130 tuned to the channel identified by the channel identifier, and End is a second tune time indicating when the viewing device 130 tuned out of the channel identified by the channel identifier (the Start and End collectively referred to as "device time data"). This, if this record is representative of the only time a particular viewing device was tuned to a channel during a 30 minute time block, then P1 for this viewing device for the time block is 0.0833 (2.5 minuted/30 minutes).

To calculate the overlap probability (second probability) of viewership overlap of a viewing device 130 in any two or more time blocks, the reach and frequency estimation engine 114 can perform the following calculation of Equation (2) below:

$$P2_{i,j\ldots n} = P1_i * P1_j * \ldots * P1_n \quad (2)$$

where $P2_{i,j\ldots n}$ is a second probability that a viewing device VD was used to present an ad in each of the time blocks i, j, . . . n; and $P1_i, P1_j \ldots P1_n$ are the respective first probabilities that the viewing device VD was used to present an ad in each of the time blocks i, j, . . . n, as given by Equation (1).

In some implementations, the second probabilities are limited to overlap for any two time blocks i and j, i.e., $P2_{i,j} = P1_i * P1_j$, as calculating overlap probabilities for all combinations of three or more time blocks for a proposed campaign can be processing intensive.

Assuming that each individual probability is equal to the partial impression or an expected impression, then the total number of partial impressions for any time block i is given by Equation (3):

$$E[|T_i|] = \sum_a P1_i^a \quad (3)$$

where $T_i$ is the set of all viewing devices used to present an ad in time block $TB_i$ and $P1_i^a$ the first probability that a viewing device a was used to present an ad in the programming defined by time block $TB_i$.

Likewise, assuming each overlap probability is equal to a partial overlap in expected impressions, then the total number of partial or expected overlapping impressions for any two time blocks $TB_i$ and $TB_j$ is given by Equation (4):

$$E[|T_i \cap T_j|] = \sum_a P2_{ij}^a \quad (4)$$

where $T_i$ is the set of all viewing devices used to present an ad in time block $TB_i$, $T_j$ is the set of all viewing devices used to present an ad in time block $TB_j$, and $P2_{ij}^a$ the second probability that a viewing device a was used to present an ad in the programming defined by time block i and time block j.

To illustrate how the first and second probabilities above can be used to derive partial impressions and overlapping impressions, considering the example case of the viewing duration of three viewing devices and two 60-minute time blocks, as shown in Table 1:

TABLE 1

|  | Time Block 1 | Time Block 2 |
| --- | --- | --- |
| Viewing Device 1 | 20 minutes | 30 minutes |
| Viewing Device 2 | 40 minutes | 10 minutes |
| Viewing Device 3 | 15 minutes | 0 minutes |

For the purpose of illustration, only two time blocks, 1 and 2, are considered. However, in practice, many more time blocks would likely be considered. Time block 1 defines a time period of sixty minutes in which programming on a first channel is aired (e.g., Channel X on Monday between 8 PM and 9 PM) and time block 2 defines a time period of sixty minutes in which programming on a second channel is aired (e.g., Channel Y on Tuesday between 3 PM and 4 PM), and viewing devices 1, 2, and 3 represent three set top boxes providing set top log data related to time block 1 and time block 2.

Table 1 shows that viewing device 1 was used to present programming in time block i for twenty minutes (e.g., viewing device 1 was used to present twenty minutes of the programming on Channel X between 8 PM and 9 PM on the previous Monday) and that viewing device 1 was used to present programming in time block j for thirty minutes (e.g., viewing device 1 was used to present thirty minutes of the programming on Channel Y between 3 PM and 4 PM on the previous Tuesday). The twenty minutes in which viewing device 1 was used to present the programming in time block 1 need not be consecutive; rather it can be an accumulation of times in which viewing device 1 was used to present the programming, e.g., the twenty minutes from time block i can be the result of ten minutes of programming presented from 8:00 PM to 8:10 PM and ten minutes of programming presented from 8:40 PM to 8:50 PM.

Similarly viewing device 2 was used to present forty minutes of programming in time block 1 and ten minutes of programming in time block 2, and viewing device 3 was used to present fifteen minutes of programming in time block 1 and was not used to present the programming in time block 2.

Assuming that each individual probability is equal to a partial impression, and each overlap probability is equal to a partial overlap in impressions, then the partial impression for each viewing device in a time block, the overlapping impression for a viewing device in two time blocks, and the total impressions for each time block and total overlapping impressions for each time block is as shown in Table 2:

TABLE 2

| VD/TB | Time Block 1 ($TB_1$) | Time Block 2 ($TB_2$) | Overlap for Time Blocks 1 & 2 ($TB_1 \cap TB_2$) |
| --- | --- | --- | --- |
| Viewing Device 1 | 20/60 = 1/3 | 30/60 = 1/2 | 1/3 * 1/2 = 1/6 |
| Viewing Device 2 | 40/60 = 2/3 | 10/60 = 1/6 | 2/3 * 1/6 = 1/9 |
| Viewing Device 3 | 15/60 = 1/4 | 0/60 = 0 | 1/4 * 0 = 0 |
| Totals: | 1/3 + 2/3 + 1/4 = 5/4 ($E[|T_1|] = 5/4$) | 1/2 + 1/6 + 0 = 2/3 ($E[|T_2|] = 2/3$) | 1/6 + 1/9 + 0 = 5/18 ($E[|T_1 \cap T_2|] = 5/18$) |

Table 2 illustrates that viewing device 1 has a 33.3% and 50% chance of being used to present an ad in time block 1 and time block 2, respectively, and thus contributes a partial impression of the ⅓ and ½, respectively. Likewise, viewing device 2 has a 66.7% and 16.7% chance of being used to present an ad in time block 1 and time block 2, and thus contributes a partial impression of ⅔ and ⅙, respectively; and viewing device 3 has a 25% and 0% chance of being used to present an ad in time block 1 and time block 2, and thus contributes a partial impression of ¼ and 0, respectively.

As underlying events of the first probabilities are considered mutually independent events, it follows that the overlap probability for each time block i and j for a viewing device is the product of the individual probabilities, i.e., $P2_{1,2}=P1_1*P1_2$. The overlap probabilities are representative of partial impressions generated by one viewing device being used in both time blocks. Accordingly, the overlapping impression for time blocks 1 and 2 for viewing device 1 are ⅙; for viewing device 2, ⅑; and for viewing device 3, 0. The total partial impressions for time block 1, as given by equation (3), is ⁵⁄₄; and for time block 2, ⅔. Finally, the total overlapping impressions for time block 1 and 2, as given by equation (4), is ⁵⁄₁₈. In practice, the first and second probabilities for the viewing devices presented in Table 2 are used only to calculate the total number of partial (expected) impressions and the total number of partial overlapping impressions, and need not be retained or otherwise stored for future use. In some implementations, the first and second probability results are discarded as an added privacy protection measure.

For a particular set of time blocks, the total number of expected viewing devices used to present ads in the time block set can be estimated by summing the numbers of expected viewing devices from each of the time blocks in the set (e.g., summing E[|Ti|] for each time block i in the set). With respect to Table 2 above, the total number of expected viewing devices used to present ads in the proposed time block set of time block 1 and time block 2 is ²³⁄₁₂, (E[|T1|]+E[|T2|]=⁵⁄₄+⅔=²³⁄₁₂).

Provided there was no overlap in impressions, the reach of the campaign would thus be ²³⁄₁₂. However, in practice there will be overlapping impressions. Thus, the values of Table 2 can be used to estimate reach and mean frequency for a proposed campaign that airs advertisements on channels corresponding to the time blocks 1 and 2, i.e., Channel X between 8 PM and 9 PM on the next Monday and Channel Y between 3 PM and 4 PM on the next Tuesday.

The values of Table 2 form an overlap matrix that is used by the reach and frequency estimation engine 114 to estimate reach and frequency for a proposed campaign that is to air on those time blocks. The overlap matrix of Table 2 has only 12 values, as only two time blocks are considered. In practice, however, for a proposed campaign, an overlap matrix would have n columns of partial impressions for n time block ($TB_1 \ldots TB_n$) and would have an additional column for the combinations of k time blocks. In some implementations, k=2, and thus for n time blocks, Table 2 will have n+n!/(2*(n−2)!) columns, where n!/(2*(n−2)!) determines the number of unique combinations for each set of two time blocks. The values in column are summed to obtain the partial impressions for each time block and the overlapping impressions for each set of k overlapping time blocks.

Using the values resulting from the overlap matrix, the reach and frequency estimation engine 114 can estimate reach and frequency for a proposed campaign that airs advertisements in the specified time blocks i and j. To evaluate a campaign for reach and frequency, the reach and frequency engine 114 receives a set of airings S={$a_1, a_2, \ldots, a_n$} that occur within the time blocks selected by the advertiser ($TB_1 \ldots TB_n$), and the estimated impressions $I_\sigma$ for each airing. The estimated impressions $I_\sigma$ for the time blocks $TB_1 \ldots TB_n$ differ from the partial impression estimates E[|Ti|] for the time blocks. In particular, the partial impression estimates are a measure of a probability that viewing devices 130 will be used to present one or more actual impressions for the time blocks. In this example, the partial impression for each time block is equal to the individual probability for that time block. The estimate impressions, however, are impression estimates for each airing, and there can be multiple airings during a time block. In some implementations, the estimated impressions $I_\sigma$ for each airing can be based off historical impression data for each time block, or can be received from a third party or process.

The total impression count for the set S is given by Equation 5:

$$I = \sum_{\sigma=1}^{n} I_\sigma \tag{5}$$

With k=2, the viewership overlap of impressions for airings $a_\sigma$ and $a_\kappa$ for any two time blocks $TB_i$ and $TB_j$, i≠j, is calculated by equation (6):

$$V_{a_\sigma a_\kappa} = \frac{E[|T_i \cap T_j|]}{E[|T_i|] + E[|T_j|]} * (I_\sigma + I_\kappa) \tag{6}$$

where the airing $a_\sigma$ is for time block i and $a_\kappa$ is for time block j. The reach and frequency estimation engine 114 calculates the proportion of partial impressions that are overlapping impressions for each pair of time blocks ($E[|T_i \cap T_j|]/(E|T_i|] + E[|T_j|]$)), and then multiplies the total projected impression count ($I_\sigma + I_\kappa$) for the two time blocks $TB_i$ and $TB_j$ to estimate the total number of overlapping impressions.

To calculate the reach for the airing set S, all overlapping impressions for each of the time block combinations summed and subtracted from the total number of estimated impressions. The reach of airing set S of airs is thus calculated by equation (7):

$$R = I - \sum_{\substack{a_\sigma a_\kappa \in S \\ a_\sigma \neq a_\kappa}} V_{a_\sigma a_\kappa} = \sum_{\sigma=1}^{n} I_\sigma - \sum_{\substack{a_\sigma a_\kappa \in S \\ a_\sigma \neq a_\kappa}} V_{a_\sigma a_\kappa} \tag{7}$$

The mean frequency of S is thus calculated as the quotient I/R. The mean frequency is a measure of an average of how often each viewing device 130 will be used to generate an impression.

Returning to the example data of Table 2, assume there is a set of two airings, the first for time block 1 and the second for time block 2, and the first airing is estimated to have 12 impressions and the second airing is estimated to have 8 impressions. Accordingly:

I=12+8=20 total impressions;
$V_{ai,aj}$=[(⁵⁄₁₈)/(⁵⁄₄+⅔)]*20=2.89 overlapping impressions
R=20−2.89=17.11 viewing devices
S=20/17.11=1.17

The overlap matrix data and the values above can be stored in the reach and frequency data store 280. The data set used to generate the overlap matrix of Table 2 is for exemplary purposes and represents only a fraction of the actual data that would be used to estimate reach for a proposed advertising campaign.

Although this example has focused on television ads, the methods and systems described herein are readily applicable to other forms of delivering advertising content such as through the radio, Internet, etc.

Figure 3:
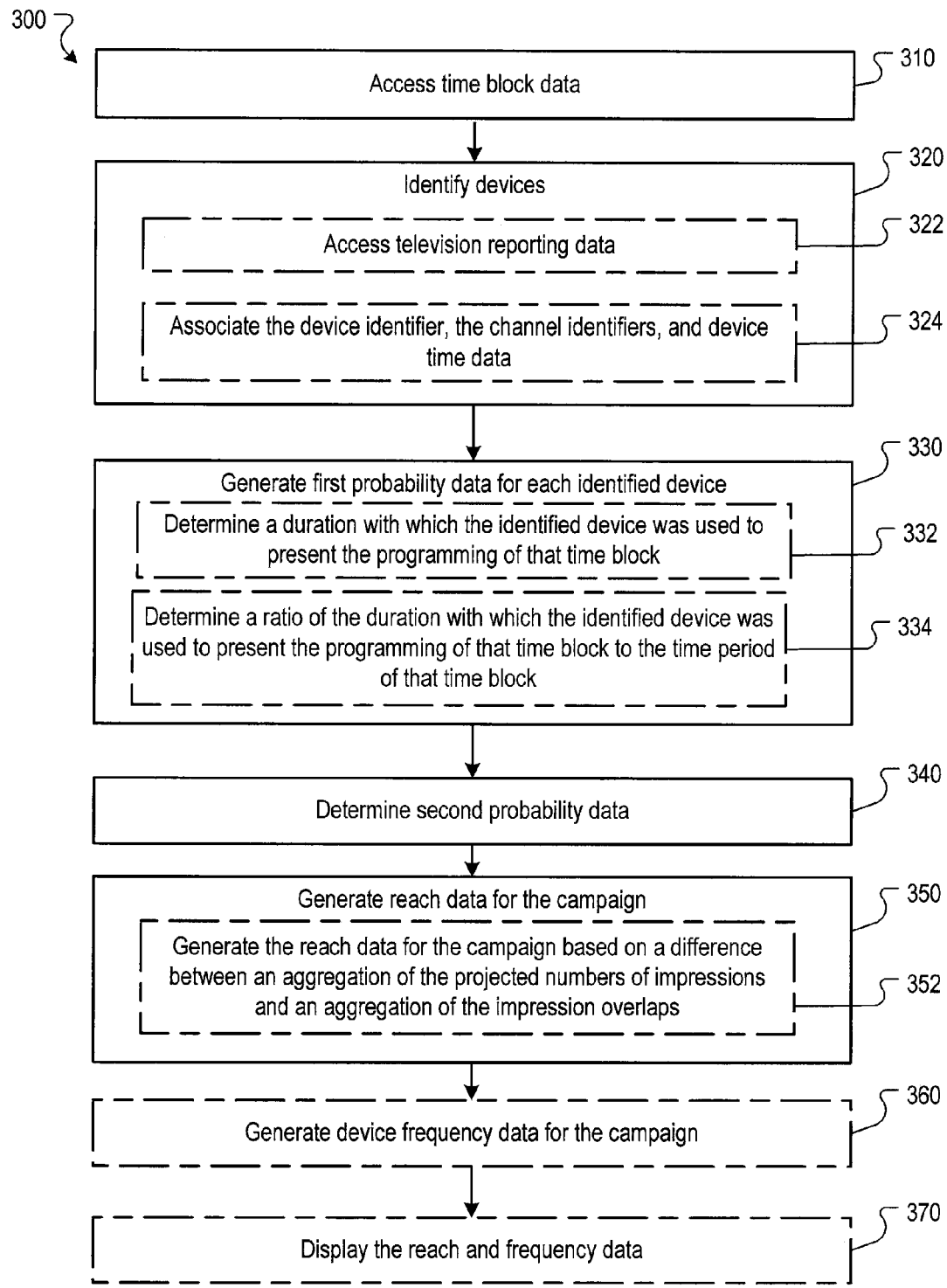
FIG. 3 is a flow-diagram of an example process for generating reach data and device frequency data.

FIG. 3 is a flow diagram of an example process for generating reach data and device frequency data. For example, the process 300 can be implemented in the television advertisement reach and frequency processing system 200 of FIG. 2.

Time block data for a plurality of time blocks are accessed (310). For example, the reach and frequency estimation engine 114 and/or the reporting engine 112 can access time block data stored in the time block data store 108. Each time block defines a time period during which programming of a channel is aired.

Devices that were used to present programming of the channel during the time period defined by each time block are identified (320). For example, for each time block, the reach and frequency estimation engine 114 can identify viewing devices 130 used to present programming of the channel during the time period defined by that time block, e.g., as stored in time block data store 108.

In some implementations, devices are identified by first accessing television reporting data for devices (322). For example, the reach and frequency estimation engine 114 and/or the reporting engine 112 can access the television reporting data. The television reporting data can include for each device a device identifier identifying the device (e.g. viewing device 130), channel identifiers identifying channels having programming that was presented by use of the device and device time data identifying times at which the programming of each of the channels was presented by use of the device.

Thereafter, the device identifier, the channel identifiers and the device time data are associated to identify the time blocks in which the device was used to present programming of the channels during the time periods defined by the time blocks (324). For example, the reach and frequency estimation engine 114 and/or the reporting engine 112 can associate the device identifier, the channel identifiers and the device time data.

First probability data for each identified device are generated (330). The first probability data include a first probability that the identified device (e.g., viewing device 130) was used to present content (e.g., ads) on the channel during the time period defined by that time block. For example, the reach and frequency estimation engine 114 can generate first probability data.

In some implementations, the first probability data for each device are generated by first determining a duration with which the identified device was used to present the programming of a time block (332). For example, the reach and frequency estimation engine 114 can determine a duration with which the identified device (e.g. viewing device 130) was used to present the programming of a time block.

Thereafter, a ratio of the duration with which the identified device was used to present the programming of a time block to the time period of that time block is determined (334). For example, the reach and frequency estimation engine 114 can determine a ratio of the duration with which the identified device (e.g. viewing device 130) was used to present the programming of a time block to the time period of that time block. In some implementations, these probabilities are normalized and account for a partial impression.

Second probability data including second probabilities that the device was used to present the content in each time block in sets of two or more time blocks are generated (340). The second probabilities are based on the first probabilities associated with the time blocks in the sets of two or more time blocks. For example, the reach and frequency estimation engine 114 can generate second probability data by multiplying the first probabilities for each of the two or more time blocks. In some implementations, the second probabilities account for an impression overlap for the time blocks.

Reach data for a campaign are generated (350). The reach data is based on the first and second probabilities and representative of a reach of the campaign to be presented in the time blocks. For example, the reach and frequency estimation engine 114 can generate reach data, as stored in the reach data and device frequency data store 280.

In some implementations, the reach data for the campaign can be generated based on a difference between an aggregation of the projected numbers of impressions and an aggregation of the impression overlaps (352). For example, the reach and frequency estimation engine 114 can generate reach data based on a difference between an aggregation of the projected numbers of impressions (e.g., "I") and an aggregation of the impression overlaps (e.g., summation of $Va_x$, $a_y$).

Optionally, device frequency data for the campaign can be generated (360). The device frequency data can be based on a ratio of the reach represented by the reach data and the aggregation of the projected numbers of impressions, and representative of a frequency with which the campaign will be presented by use of a unique device on the channels during the time periods defined by the time blocks. For example, the reach and frequency estimation engine 114 can generate the device frequency data based on a ratio of the reach R represented by the reach data and the aggregation of the projected numbers of impressions I.

Optionally, the reach and frequency data are displayed (370). For example, the television advertisement reach and frequency processing system 200 can facilitate the display of the reach data on a computer monitor or in a reach data/reach data and device frequency data report provided to television advertisers.

Figure 4:
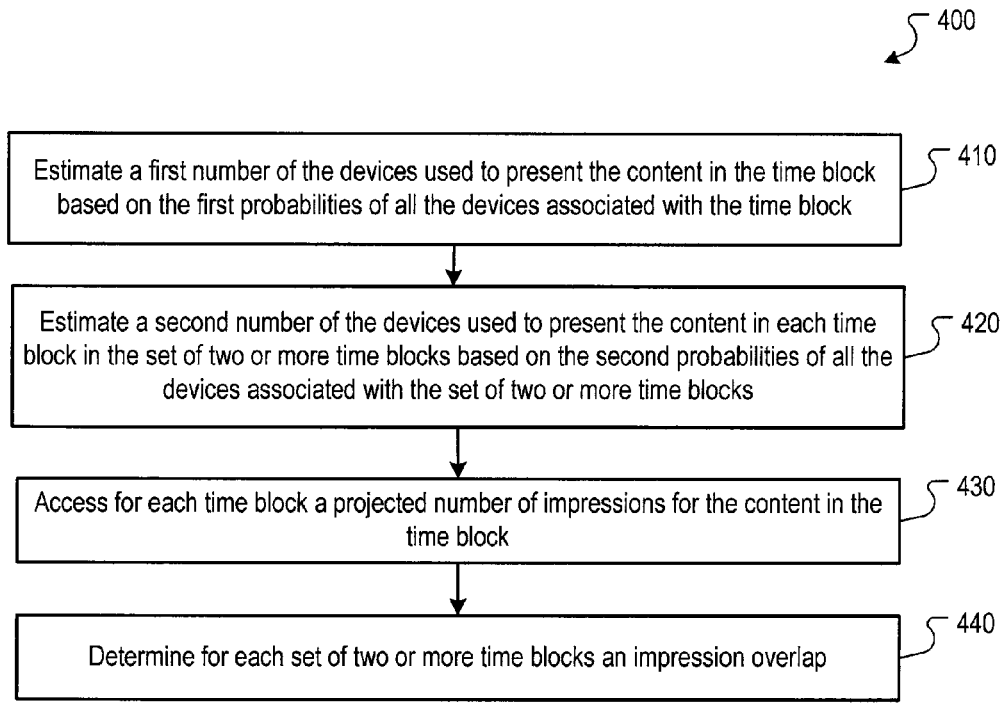
FIG. 4 is a flow diagram of an example process for processing first and second probabilities to generate reach data and device frequency data.

FIG. 4 is a flow diagram of an example process 400 for processing first and second probabilities to generate reach data and device frequency data.

A first number of the devices used to present the content in the time block based on the first probabilities of all the devices associated with the time block are estimated (410). For example, the reach and frequency estimation engine 114 can estimate a first number of the viewing devices 130 used to present the content in the time block based on the first probabilities of all the viewing devices 130 associated with the time block.

A second number of the devices used to present the content in each time block in the set of two or more time blocks based on the second probabilities of all the devices associated with the set of two or more time blocks is estimated (420). For example, the reach and frequency estimation engine 114 can estimate a second number of the viewing devices 130 used to present the content in each time block in the set of two or more time blocks based on the second probabilities of all the viewing devices 130 associated with the set of two or more time blocks.

For each time block a projected number of impressions for the content in the time block is accessed (430). For example, the reach and frequency estimation engine 114 can access for each time block a projected number of impressions for the content in the time block (e.g., the portion of "I" attributable to a specific ad airing/time block).

For each set of two or more time blocks an impression overlap is determined (440). For example, the reach and frequency estimation engine 114 can determine for each set of two or more time blocks an impression overlap (e.g., $Va_x$, $a_y$).

Figure 5:
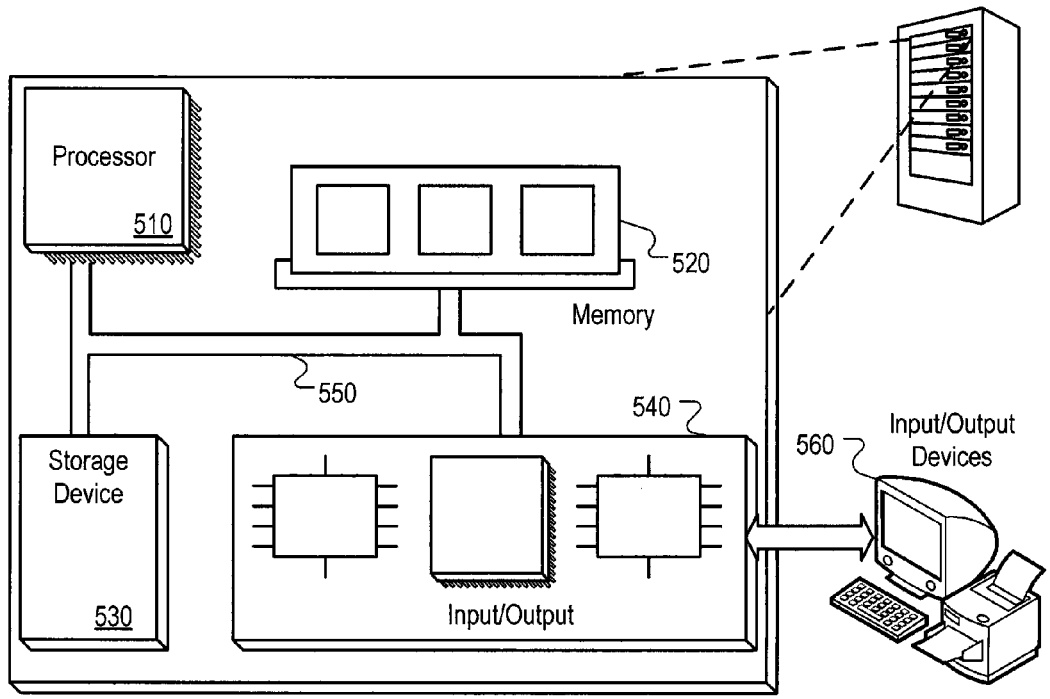
FIG. 5 is block diagram of an example computer system.

FIG. 5 is block diagram of an example computer system 500. The system 500 can be used to implement the reach and frequency processing system 200 of FIG. 2. The system 500 includes a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 560.

The uniform distributions modeling viewer behavior for a time block is illustrative only. Other distributions can also be used. Additionally, in some models, the individual probabilities can be considered dependent instead of independent, and the second probabilities can be adjusted accordingly. Finally, overlap for more than two time blocks can also be considered.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

Embodiments of the subject matter described in this specification can be implemented as one or more computer program products, i.e., one or more modules of computer program instructions encoded on a tangible program carrier for execution by, or to control the operation of, data processing apparatus. The computer readable medium can be a machine readable storage device, a machine readable storage substrate, a memory device, a composition of matter effecting a machine readable propagated signal, or a combination of one or more of them.

The engines herein can be implemented as computer programs (also known as a program, software, software application, script, or code) and can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
   accessing time block data for a plurality of time blocks, each time block defining a time period during which programming of a channel is aired;
   for each time block:

identifying devices that were used to present programming of the channel during the time period defined by that time block; and generating first probability data for each identified device, the first probability data including a first probability that the identified device was used to present content on the channel during the time period defined by that time block;

for each device, generating second probability data including second probabilities that the device was used to present the content in each time block in sets of two or more time blocks, wherein the second probabilities are based on the first probabilities associated with the time blocks in the sets of two or more time blocks; and generating reach data for a campaign, the reach data based on the first and second probabilities and representative of a reach of the campaign to be presented in the time blocks.

2. The method of claim 1, wherein identifying devices that were used to present programming of the channel during the time period defined by that time block comprises:

accessing television reporting data for devices, the television reporting data including for each device:
a device identifier identifying the device;
channel identifiers identifying channels having programming that was presented by use of the device;
device time data identifying times at which the programming of each of the channels was presented by use of the device; and associating the device identifier, the channel identifiers and the device time data to identify the time blocks in which the device was used to present programming of the channels during the time periods defined by the time blocks.

3. The method of claim 1 wherein determining for each identified device a first probability that the identified device was used to present content in that time block comprises:

determining a duration with which the identified device was used to present the programming of that time block; and determining a ratio of the duration with which the identified device was used to present the programming of that time block to the time period of that time block.

4. The method of claim 3 wherein the second probabilities are products of the first probabilities associated with the time blocks in the sets of two or more time blocks.

5. The method of claim 1 wherein generating reach data for a campaign comprises:

for each time block, estimating a first number of the devices used to present the content in the time block based on the first probabilities of all the devices associated with the time block;

for each set of two or more time blocks, estimating a second number of the devices used to present the content in each time block in the set-of two or more time blocks based on the second probabilities of all the devices associated with the set of two or more time blocks;

accessing for each time block a projected number of impressions for the content in the time block; and determining for each set of two or more time blocks an impression overlap based on:
the first numbers of the devices corresponding to the time blocks in the set of two or more time blocks;
the second number of the devices corresponding to the set of two or more time blocks; and
the projected numbers of impressions corresponding to the time blocks in the set of two or more time blocks.

6. The method of claim 5 wherein generating reach data for a campaign comprises:

generating the reach data for the campaign based on a difference between an aggregation of the projected numbers of impressions and an aggregation of the impression overlaps.

7. The method of claim 6, further comprising:

generating device frequency data for the campaign, the device frequency data based on a ratio of the reach represented by the reach data and the aggregation of the projected numbers of impressions, and representative of a frequency with which the campaign will be presented by use of a unique device on the channels during the time periods defined by the time blocks.

8. The method of claim 6, wherein accessing for each time block a projected number of impressions for the content in the time block comprises:

identifying airings scheduled to occur in the time block; and identifying estimated impressions for each airing.

9. The method of claim 1 wherein the device is a set top box.

10. The method of claim 9 wherein the content is a television commercial.

11. A system, comprising:

one or more processing devices; and software stored on a computer readable medium comprising instructions executable by the one or more processing devices and upon such execution cause the one or more processing devices to perform operations comprising:

access time block data for a plurality of time blocks, each time block defining a time, period during which programming of a channel is aired;

for each time block:
identify devices that were used to present programming of the channel during the time period defined by that time block; and
generate for each identified device first probability data including a first probability that the identified device was used to present content on the channel during the time period defined by that time block;

for each device, generate second probability data including second probabilities that the device was used to present the content in each time block in sets of two or more time blocks, wherein the second probabilities are based on the first probabilities associated with the time blocks in the sets of two or more time blocks; and generate reach data for a campaign, the reach data based on the first and second probabilities and representative of a reach of the campaign to be presented in the time blocks.

12. The system of claim 11 wherein the instructions executable by the one or more processing devices and upon such execution cause the one or more processing devices to identify devices that were used to present programming of the channel during the time period defined by that time block also cause the one or more processing devices to perform operations comprising:

access television reporting data for devices, the television reporting data including for each device:
a device identifier identifying the device;
channel identifiers identifying channels having programming that was presented by use of the device;
device time data identifying times at which the programming of each of the channels was presented by use of the device; and associate the device identifier, the channel identifiers and the device time data to identify the time blocks in which the device was used to present programming of the channels during the time periods defined by the time blocks.

13. The system of claim 11 wherein the instructions executable by the one or more processing devices and upon such execution cause the one or more processing devices to determine for each identified device a first probability that the identified device was used to present content in that time block also cause the one or more processing devices to perform operations comprising:

determine a duration with which the identified device was used to present the programming of that time block; and determine a ratio of the duration with which the identified device was used to present the programming of that time block to the time period of that time block.

14. The system of claim 13 wherein the second probabilities are products of the first probabilities associated with the time blocks in the sets of two or more time blocks.

15. The system of claim 11 wherein the instructions executable by the one or more processing devices and upon such execution cause the one or more processing devices to generate reach data for a campaign also cause the one or more processing devices to perform operations comprising:

for each time block, estimate a first number of the devices used to present the content in the time block based on the first probabilities of all the devices associated with the time block;

for each set of two or more time blocks, estimate a second number of the devices used to present the content in each time block in the set of two or more time blocks based on the second probabilities of all the devices associated with the set of two or more time blocks;

access for each time block a projected number of impressions for the content in the time block; and determine for each set of two or more time blocks an impression overlap based on:

the first numbers of the devices corresponding to the time blocks in the set of two or more time blocks;

the second number of the devices corresponding to the set of two or more time blocks; and the projected numbers of impressions corresponding to the time blocks in the set of two or more time blocks.

16. The system of claim 15 wherein the instructions executable by the one or more processing devices and upon such execution cause the one or more processing devices to generate reach data for a campaign also cause the one or more processing devices to perform operations comprising:

generate the reach data for the campaign based on a difference between an aggregation of the projected numbers of impressions and an aggregation of the impression overlaps.

17. The system of claim 16 wherein the software comprises instructions executable by the one or more processing devices and upon such execution cause the one or more processing devices to perform operations comprising:

generate device frequency data for the campaign, the device frequency data based on a ratio of the reach represented by the reach data and the aggregation of the projected numbers of impressions, and representative of a frequency with which the campaign will be presented by use of a unique device on the channels during the time periods defined by the time blocks.

18. The system of claim 11 wherein the device is a set top box.

19. The system of claim 18 wherein the content is a television commercial.

20. A computer-implemented method, comprising:

identifying a plurality of time blocks, each time block defining a time period during which programming of a channel is aired;

for each time block:

identifying devices that were used to present programming of the channel during the time period defined by that time block; and generating for each identified device first probability data including a first probability that the identified device was used to present content on the channel during the time period defined by that time block;

generating for each device second probability data including second probabilities that the device was used to present the content in each time block in sets of two or more time blocks, wherein the second probabilities are based on the first probabilities associated with the time blocks in the sets of two or more time blocks;

generating reach data for a campaign, the reach data based on the first and second probabilities and representative of a reach of the campaign to be presented in the time blocks; and providing access to the reach data to advertisers.

* * * * *

UNITED STATES PATENT AND TRADEMARK OFFICE
CERTIFICATE OF CORRECTION

PATENT NO. : 8,087,041 B2  
APPLICATION NO. : 12/331938  
DATED : December 27, 2011  
INVENTOR(S) : Qi Fu et al.

Page 1 of 1

It is certified that error appears in the above-identified patent and that said Letters Patent is hereby corrected as shown below:

Column 15, Line 55, In Claim 5, delete "set-of" and insert -- set of --, therefor.

Column 16, Line 33, In Claim 11, delete "time," and insert -- time --, therefor.

Signed and Sealed this
Twentieth Day of March, 2012

David J. Kappos
*Director of the United States Patent and Trademark Office*